United States Patent
Takahashi et al.

(10) Patent No.: US 10,572,311 B2
(45) Date of Patent: Feb. 25, 2020

(54) VIRTUAL NETWORK CONTROL APPARATUS, VIRTUAL NETWORK CONTROL METHOD, AND PROGRAM

(71) Applicants: NIPPON TELEGRAPH AND TELEPHONE CORPORATION, Chiyoda-ku (JP); OSAKA UNIVERSITY, Suita-shi (JP)

(72) Inventors: Yousuke Takahashi, Musashino (JP); Keisuke Ishibashi, Musashino (JP); Noriaki Kamiyama, Musashino (JP); Kohei Shiomoto, Musashino (JP); Yuichi Ohshita, Suita (JP); Masayuki Murata, Suita (JP)

(73) Assignees: NIPPON TELEGRAPH AND TELEPHONE CORPORATION, Chiyoda-ku (JP); OSAKA UNIVERSITY, Suita-shi (JP)

( * ) Notice: Subject to any disclaimer, the term of this patent is extended or adjusted under 35 U.S.C. 154(b) by 104 days.

(21) Appl. No.: 15/571,925

(22) PCT Filed: Apr. 22, 2016

(86) PCT No.: PCT/JP2016/062772
§ 371 (c)(1),
(2) Date: Nov. 6, 2017

(87) PCT Pub. No.: WO2016/178376
PCT Pub. Date: Nov. 10, 2016

(65) Prior Publication Data
US 2018/0143864 A1 May 24, 2018

(30) Foreign Application Priority Data
May 7, 2015 (JP) .................................. 2015-095193

(51) Int. Cl.
*G06F 9/50* (2006.01)
*H04L 12/24* (2006.01)
(Continued)

(52) U.S. Cl.
CPC ........ *G06F 9/5077* (2013.01); *H04L 41/0896* (2013.01); *H04L 47/762* (2013.01);
(Continued)

(58) Field of Classification Search
None
See application file for complete search history.

(56) References Cited

U.S. PATENT DOCUMENTS

2010/0083248 A1* 4/2010 Wood .................... G06F 9/5077
718/1
2011/0246647 A1 10/2011 Marquezan et al.

FOREIGN PATENT DOCUMENTS

JP 2012-511292 A 5/2012
JP 2013-175810 A 9/2013

OTHER PUBLICATIONS

International Search Report dated Jul. 19, 2016 in PCT/JP2016/062772 filed Apr. 22, 2016.
(Continued)

*Primary Examiner* — Jeffrey R Swearingen
(74) *Attorney, Agent, or Firm* — Oblon, McClelland, Maier & Neustadt, L.L.P.

(57) ABSTRACT

A virtual network control apparatus configured to perform assignment of physical resources under management for a virtual network embedding request, including: a physical network resource management agent configured to manage use state of resources on a physical network at each future time; and a virtual network control agent, the virtual network control agent including: demand prediction means configured to perform prediction of future demand for a virtual
(Continued)

network; and use resource determination means configured to calculate physical resources to be used at each future time by the virtual network based on a prediction result of the demand obtained by the demand prediction means and information of future use state of resources on the physical network obtained from the physical network resource management agent, and to notify the physical network resource management agent of information of physical resources of the calculation result.

8 Claims, 4 Drawing Sheets

(51) Int. Cl.
  *H04L 12/923* (2013.01)
  *H04L 12/911* (2013.01)
  *H04L 12/46* (2006.01)
(52) U.S. Cl.
  CPC .......... *H04L 47/822* (2013.01); *H04L 47/823* (2013.01); *G06F 2209/5019* (2013.01); *H04L 12/4641* (2013.01); *H04L 41/046* (2013.01)

(56) References Cited

OTHER PUBLICATIONS

Paul Barham et al., "Xen and the Art of Virtualization", Proceedings of the Nineteenth ACM Symposium on Operating Systems Principles, 2003, pp. 14 total pages.
Christopher Clark et al., "Live Migration of Virtual Machines", NSDI '05: $2^{nd}$ Symposium on Networked Systems Design & Implementation, 2005, vol. 2, pp. 273-286.
N. M. Mosharaf Kabir Chowdhury et al., "Network Virtualization: State of the Art and Research Challenges", IEEE Communications Magazine, Jul. 2009, vol. 47, No. 7, pp. 20-26.
Andreas Fischer et al., "Virtual Network Embedding: A Survey", IEEE Communications Surveys and Tutorials, 2013, vol. 15, No. 4, 19 total pages.
Ilhem Fajjari et al., "VNR Algorithm: A Greedy Approach For Virtual Networks Reconfigurations", Proceedings of Global Telecommunications Conference, 2011, 7 total pages.
Yuichi Ohsita et al., "Resource Optimization of Virtual Networks Based on Model Predictive Control", IEICE Technical Report, Oct. 9, 2014, vol. 114, No. 253, 8 total pages (with English abstract).
Takahiro Fukuno et al., "Study of Placement of Virtual Service Resources Based on Link Load", IEICE Technical Report, Feb. 23, 2015, vol. 114, No. 477, 6 total pages (with English abstract).

* cited by examiner

VIRTUAL NETWORK CONTROL APPARATUS, VIRTUAL NETWORK CONTROL METHOD, AND PROGRAM

TECHNICAL FIELD

The present invention relates to a virtual network control technique. Especially, the present invention relates to a technique for realizing resource assignment that meets requests of many service providers while coping with situations where requests from each service provider momentarily change, in a virtual network operator that assigns resources on a physical network in response to a virtual network construction request, transmitted from a service provider, including computer resources required for the service provider and communication performances required between the computer resources.

BACKGROUND ART

With the progress of virtualization techniques of computer resources, it becomes possible to operate multiple virtual computers on one computer (refer to the non-patent document 1).

Also, development of a technique called live migration is under way to transfer a system operating as a virtual computer to another computer on a certain physical computer without stopping the system (refer to the non-patent document 2).

In addition, development of a technique for virtualizing a network is under way (refer to the non-patent document 3), so that it is possible to construct a plurality of virtual networks on a single physical network.

Discussion is being made on a method of embedding virtual nodes and a virtual network connecting between virtual nodes by using network resources and computers held by a network operator (to be referred to as a infra provider hereinafter) that maintains and manages physical networks by utilizing these techniques (refer to non-patent document 4). In this discussion, a virtual network operator that controls the virtual network arranges necessary virtual nodes and virtual resources to construct the virtual network in order to meet requests from a service provider that actually provides network services. Then, the constructed virtual network is provided to the service provider, so that services of the service provider are provided using the virtual network.

In this environment, resources required by each virtual network momentarily change due to change of demand and the like for services provided by service providers. Also, the number of virtual networks that need to be embedded changes over time, in which, for example, it becomes necessary to embed a new virtual network when launching a new service, or a virtual network becomes unnecessary as a service ends. For such an environmental change, a method for reconstructing an already embedded virtual network has been discussed (refer to non-patent document 5).

RELATED ART DOCUMENT

Non Patent Document

[NON PATENT DOCUMENT 1] Paul Barham, Boris Dragovic, Keir Fraser, Steven Hand, Tim Harris, Alex Ho, Rolf Neugebauer, Ian Pratt, and Andrew Warfield, "Xen and the art of virtualization," in Proceedings of the nineteenth ACM symposium on Operating Systems Principles, pp. 164-177, 2003.

[NON PATENT DOCUMENT 2] Christopher Clark, Keir Fraser, Steven Hand, Jacob Gorm Hansen, Eric Jul, Christian Limpach, Ian Pratt, and Andrew Warfield, "Live migration of virtual machines," in Proceedings of the 2nd conference on Symposium on Networked Systems Design & Implementation—Volume 2 (NSDI'05), Vol. 2, pp. 273-286, 2005.

[NON PATENT DOCUMENT 3] N. M. M. K. Chowdhury, "Network virtualization: State of the art and research challenges," IEEE Communications Magazine, vol. 47, no. 7, pp. 20-26, July 2009

[NON PATENT DOCUMENT 4] Andreas Fischer, Juan Felipe Botero, Michael Till Beck, Hermann de Meer, and Xavier Hesselbach, "Virtual Network Embedding: A Survey," IEEE COMMUNICATIONS SURVEYS & TUTORIALS, VOL. 15, NO. 4, 2013.

[NON PATENT DOCUMENT 5] I. Fajjari, N. Aitsaadi, G. Pujolle, and H. Zimmermann, "VNR algorithm: A greedy approach for virtual networks reconfigurations," in Proceedings of Global Telecommunications Conference (GLOBECOM 2011), 2011.

SUMMARY OF THE INVENTION

Problem to be Solved by the Invention

In virtual network embedding, in order to meet the performance of the virtual network even when change of demand occurs for the embedded virtual network, it is necessary to reconstruct the virtual network. When reconstructing a virtual network, it is possible to move a virtual node from a currently installed computer to another computer using the method disclosed in the non-patent document 2 as necessary. However, it puts a heavy load on the network since transfer of image data of the virtual node is included in the move procedure.

In the non-patent document 5, a method for reconstructing a virtual network according to change of situations is discussed. However, only demand observed at each time is considered for the reconstruction, so that there is a problem in that the reconstruction is on an ad hoc basis. As a result, transfer of virtual nodes occurs many times, which may put large load on the network.

On the other hand, a method can be considered to intensively calculate future demands of all virtual networks, and based on the result, determine virtual network embedding portions over the future while minimizing movement of virtual nodes. However, according to this method, the larger the number of accommodated virtual networks becomes, the longer the computation time becomes. As a result, it is necessary to lengthen the control interval of virtual network reconstruction, so that a problem occurs in which, after environmental change occurs, it takes time to cope with the environmental change.

The present invention is contrived in view of the above-mentioned points, and an object of the present invention is to provide a technique for realizing virtual network control that follows environmental change.

Means for Solving the Problem

According to an embodiment of the present invention, there is provided a virtual network control apparatus configured to perform assignment of physical resources under management for a virtual network embedding request, including:

a physical network resource management agent configured to manage use state of resources on a physical network at each future time; and a virtual network control agent that is provided for each virtual network, the virtual network control agent including:

demand prediction means configured to perform prediction of future demand for a corresponding virtual network; and use resource determination means configured to calculate physical resources to be used at each future time by the virtual network based on a prediction result of the demand obtained by the demand prediction means and information of future use state of resources on the physical network obtained from the physical network resource management agent, and to notify the physical network resource management agent of information of physical resources of the calculation result.

Effect of the Present Invention

According to an embodiment of the present invention, it becomes possible to realize virtual network control that follows environmental change.

EMBODIMENTS FOR CARRYING OUT THE INVENTION

Figure 1:
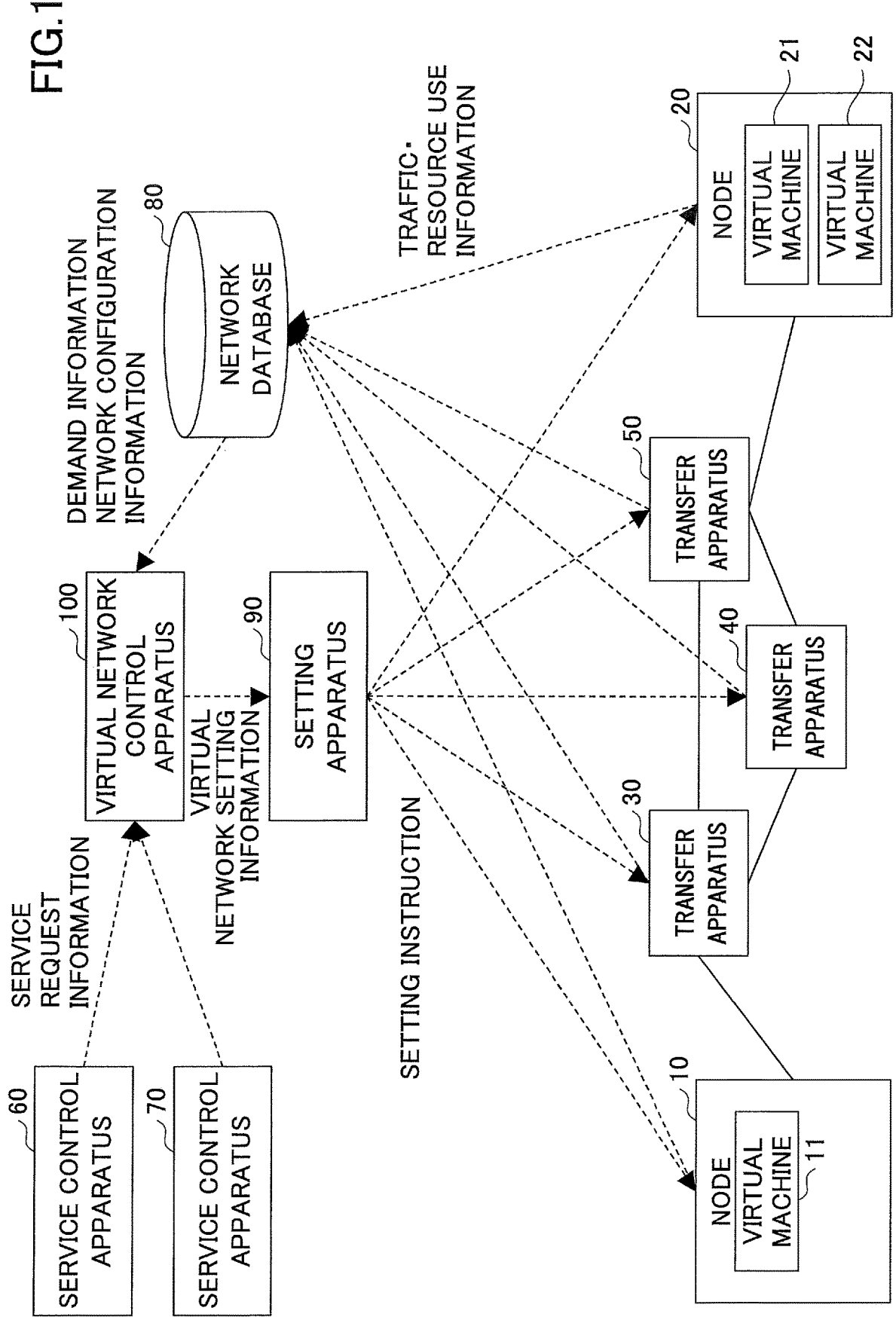
FIG. 1 is a configuration example of a system according to an embodiment of the present invention.

In the following, an embodiment of the present invention is described with reference to figures. The embodiment described below is merely an example, and embodiments to which the present invention is applied are not limited to the following embodiments.

(Outline of Embodiment)

The technique of the present embodiment is one for predicting change of demand, and, while using the prediction result, performing calculation of resource assignment to virtual networks such that demand of virtual networks accommodated in the physical network is satisfied as much as possible, at a short time period by cooperation of agents in a virtual network control apparatus. As a result, by changing assigned resources of the virtual network while predicting the future, load of movement of virtual nodes and the like can be suppressed, and by performing control at a short period, it is possible to follow demand change in a short time.

That is, in the present embodiment, a virtual network control apparatus configured to perform assignment of physical resources under management for a virtual network embedding request from a service provided is provided.

The virtual network control apparatus includes a physical network resource management agent configured to manage use state of resources on a physical network at each future time; and a virtual network control agent that is provided for each virtual network, and that includes:

a function configured to perform prediction of future demand in the virtual network; and a function configured to calculate physical resources to be used at each future time by the virtual network based on the prediction result and information of future use state of resources on the physical network obtained from the physical network resource management agent, and to notify the physical network resource management agent of it.

In the virtual network control apparatus, each virtual network control agent calculates physical resources for use at each future time in the corresponding virtual network, notifies the physical network resource management agent of a calculation result, and determines resources that each virtual network uses while exchanging, via the physical network resource management agent, information on resources that other virtual networks want to use at each future time.

In the present embodiment, as described above, since each virtual network control agent is configured to calculate only resources to be used by the corresponding virtual network, the solution space of the problem solved by each agent becomes small, so that it is possible to perform calculation of use resources in a short time.

Also, each virtual network control agent of the present embodiment inputs the prediction result of demand of the corresponding virtual network at each future time and use state of resources of the physical network of other virtual networks at each future time, and determines resources to be used by the virtual network at each future time by solving an optimization problem for minimizing a weighted sum of an indicator on use state of physical resources and an indicator on load for change of assignment of resources at each time.

By performing such calculation, it becomes possible to perform resource assignment that suppresses load for virtual network reconstruction while coping with demand change of the predicted virtual network and the other virtual networks.

Further, in the present embodiment, by informing the physical network resource management agent of the calculated resources to be used by the virtual network, resource assignment of the virtual network over the future can be shared with other virtual network control agents via the physical network resource management agent. Then, each virtual network control agent repeats processing of, at a next time, recalculating use resources of the virtual network based on the shared future use resource information of each virtual network and demand of the virtual network that is predicted again (example: demand that is corrected from previous demand based on new observation data), so that it becomes possible to perform control while correcting errors even when there is an prediction error or even when unpredicted environmental change occurs, and resource assignment to virtual networks that follows demand change can be realized.

That is, by using the technique of the present embodiment, for a virtual network construction request, sent from a service provider, that includes required computer resources and communication performance required between computer resources, in a virtual network operator that performs assignment of resources on a physical network, it becomes possible to realize stable virtual network accommodation suppressing load for virtual network reconstruction while following temporal change of demand from each service provider. In the following, an embodiment of the present invention is described more specifically.

(System Whole Configuration Example)

FIG. 1 shows a configuration example of a system of the present embodiment. In the system of the present embodiment, a plurality of nodes 10 and 20 are connected to transfer apparatuses 30-50, and transfer apparatuses are connected by links.

Each node is a physical computer (computer), for example. Each transfer apparatus is, for example, a physical communication apparatus, and is, for example, a router, a switch, or the like. In each node, it is possible to operate a single virtual node or a plurality of virtual nodes (virtual machines). In the example of FIG. 1, a virtual machine 11 operates in the node 10, and virtual machines 21 and 22 operate in the node 20.

The system according to the present embodiment is provided with a network database 80. Network configuration information and "resources of each node and traffic information of each transfer apparatus" used by each virtual network are collected in the network database 80.

Also, as shown in FIG. 1, in the system in the present embodiment, service control apparatuses 60 and 70 corresponding to each service are provided, and further, a virtual network control apparatus 100 and a setting apparatus 90 are provided.

Each service control apparatus issues a virtual network embedding request corresponding to a relevant service. The virtual network control apparatus 100 receives virtual network embedding requests from the service control apparatuses 60, 70, and obtains, from the network database 80, network configuration information, resource use state and traffic information of each node of each virtual network to determine node resources and network resources to be assigned to each virtual network. Based on the determined resource information assigned to each virtual network, the setting apparatus 90 inputs settings in each node for causing the node to operate a virtual node, and inputs settings of route/band restriction in each transfer apparatus.

(Configuration and Operation of the Virtual Network Control Apparatus 100)

Figure 2:
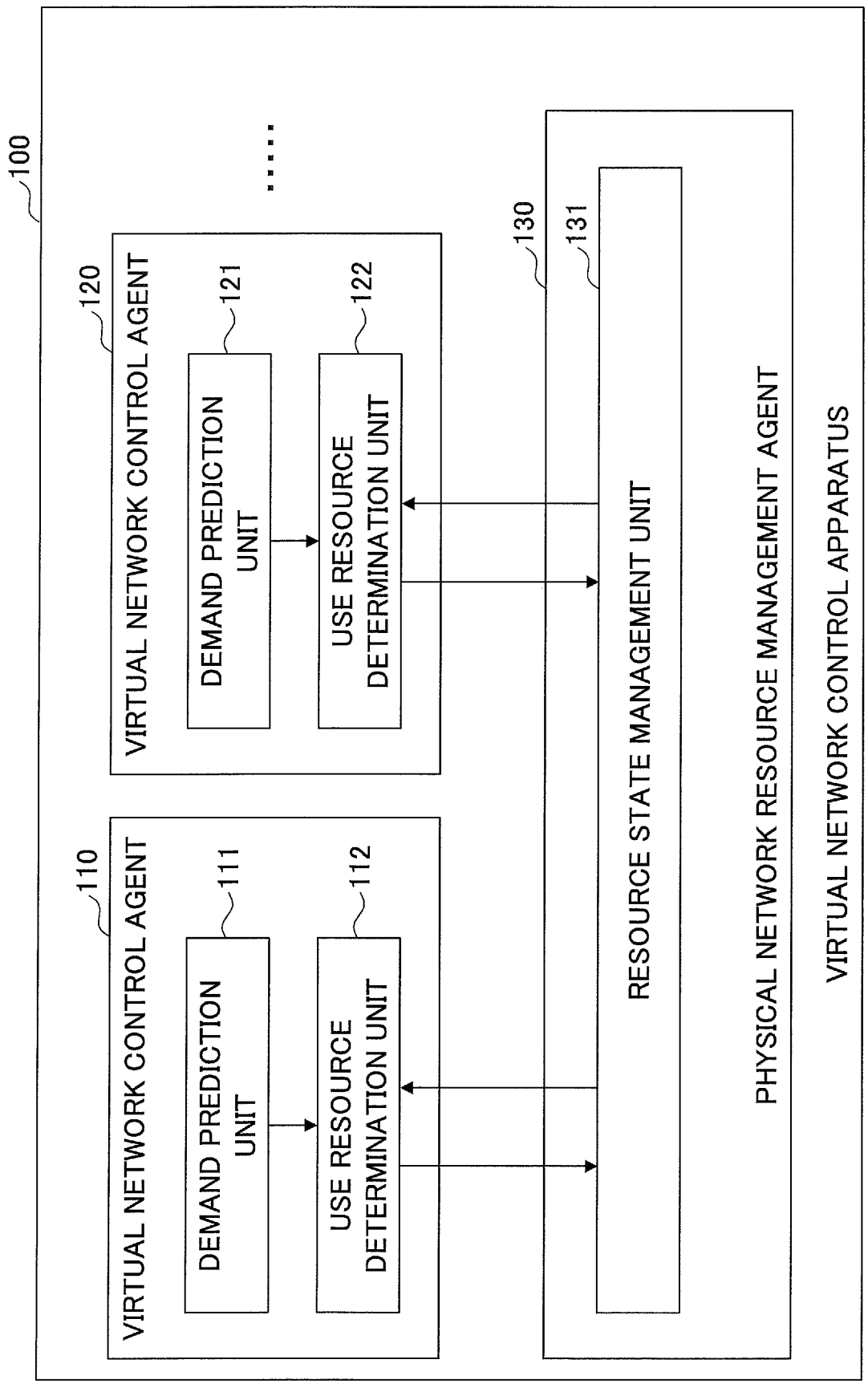
FIG. 2 is a configuration example of a virtual network control apparatus according to an embodiment of the present invention.

FIG. 2 shows a configuration example of the virtual network control apparatus 100 in the present embodiment. As shown in FIG. 2, the virtual network control apparatus 100 includes virtual network control agents 110, 120, . . . , and a physical network resource management agent 130. Note that the virtual network control agent may be referred to as "virtual network control unit", and the physical network resource management agent may be referred to as "physical network resource management unit".

Since each virtual network control agent has similar configuration, the virtual network control agent 110 is taken as an example. The virtual network control agent 110 includes a demand prediction unit 111, and a use resource determination unit 112. Other virtual network control agents have similar configuration.

The physical network resource management agent 130 includes a resource state management unit 131. In the following, an outline of the operation of each functional unit is described.

The physical network resource management agent 130 performs, by the resource state management unit 131, management of resources of nodes arranged in the network and management of use state of communication bands of each link at each future time. That is, the physical network resource management agent 130 includes storage means such as a memory, and stores information of these resources, information of use state at each future time and the like.

The virtual network control agent is a functional unit to be arranged corresponding to each virtual network. When a new virtual network embedding request arrives, a new virtual network management agent is generated. To be "generated" is that, for example, a program corresponding to the virtual network management agent is launched in the virtual network control apparatus 100.

In each virtual network control agent (the virtual network control agent 110 as an example), the demand prediction unit 111 predicts demand of the corresponding virtual network. The use resource determination unit 112 determines resources to be used by the corresponding virtual network in the future based on the demand predicted by the demand prediction unit 111 and resource use state of other virtual networks at each future time obtained from the physical network resource management agent 130. Then, the use resource determination unit 112 transmits, to the physical network resource management agent 130, the determined resources utilized at each future time so as to update information of future resource use state of each virtual network held by the physical network resource management agent 130.

Figure 3:
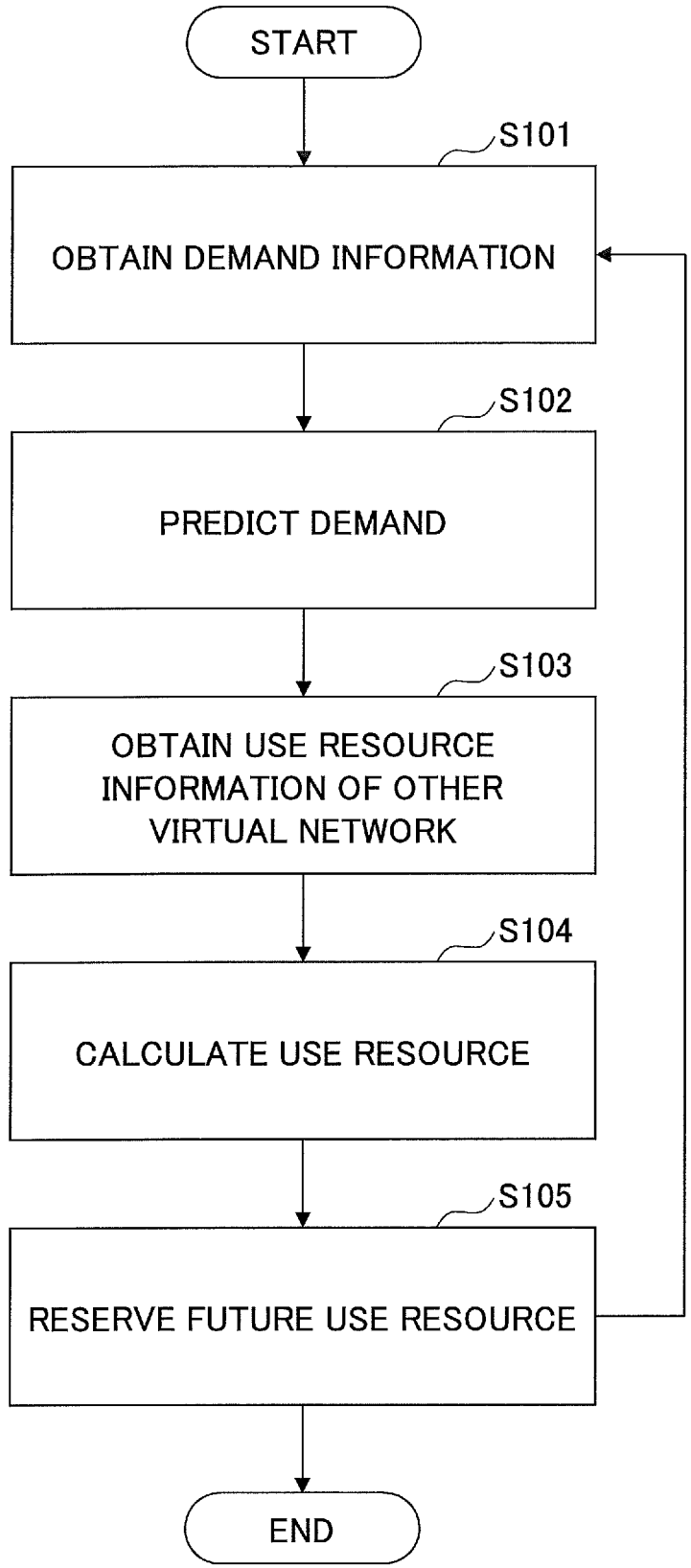
FIG. 3 is a flowchart showing operation of a virtual network control agent in the virtual network control apparatus according to an embodiment of the present invention.

FIG. 3 is a flowchart showing operation of the virtual network control agent 110 in the virtual network control apparatus 100 according to the present embodiment. Here, an example of the operation of the virtual network control agent 110 is described, but other virtual network control agents perform similar operation.

First, the virtual network control agent 110 obtains, from the network database 80, current traffic information of the virtual network and use information of virtual nodes (these can be called observation data) to ascertain demand of the current virtual network (the virtual network of a service corresponding to the virtual network control agent 110) (step S101).

After that, the virtual network control agent 110 predicts demand of the virtual network over the future based on the obtained demand information (step S102). Note that the method of demand prediction is not limited to a particular method. For example, an existing method of demand prediction can be used. Also, the virtual network control agent 110 obtains, from the physical network management agent 130, information of resources that other virtual networks plan to use at each future time (step S103).

Then, the virtual network control agent 110 calculates use plan of resources over the future based on the information of resources that the other virtual networks plan to use in the future and prediction of its own demand of the virtual network such that demands of more virtual networks can be satisfied and that the number of virtual nodes that require movement at each time becomes the smallest (step S104).

Then, the virtual network control agent 110 starts reservation and use of resources of a next time based on the plan, and informs the physical network resource management agent 130 of the use plan of resources over the future. After that, returning back to obtaining of demand information, the virtual network control agent 110 performs prediction again, obtains the newest use plan of future resources of the other virtual networks, and recalculates use plan of future resources. By repeating this processing in a short time, each virtual network agent can perform control coping with demand change while avoiding load by movement of virtual nodes by considering future demand change. Note that end timing of repeating processing is arbitrary, but, for example, the processing can be ended by an instruction from a user of the control apparatus.

The virtual network control apparatus 100 of the present embodiment can be realized by causing one or a plurality of computers to execute a program which describes the process content described in the present embodiment, for example. More specifically, the function of the virtual network control apparatus 100 can be realized by executing a program corresponding to processes performed by the virtual network control apparatus 100 by using hardware resources such as a CPU, memory and hard disk and the like in the computer. The program can be saved and distributed by recording the program in a computer readable recording medium (such as portable memory). Also, the program can be provided via a network such as the Internet, an electronic mail and the like.

Figure 4:
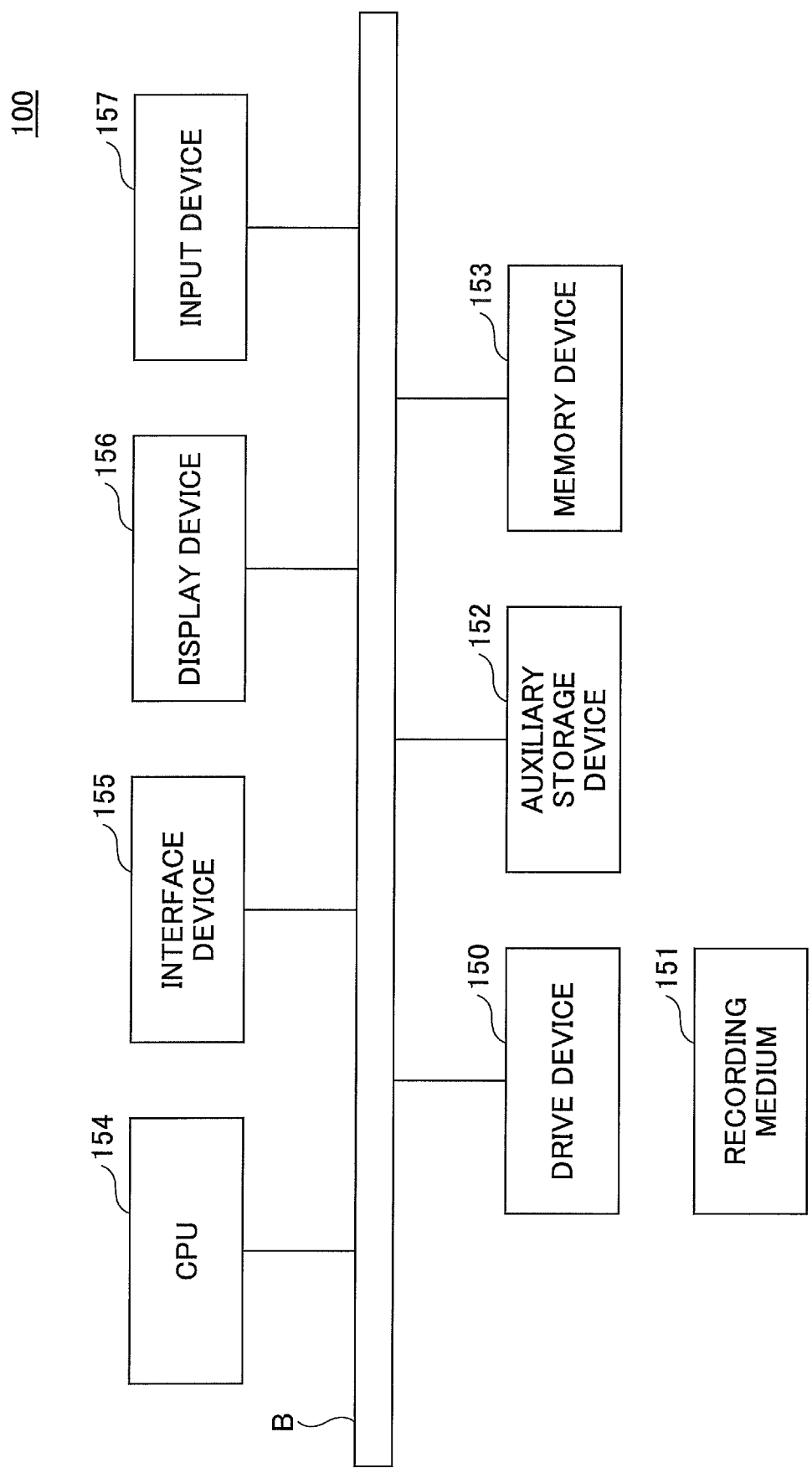
FIG. 4 is a hardware configuration example of the virtual network control apparatus according to an embodiment of the present invention.

FIG. 4 is a diagram illustrating an example of a hardware configuration of the virtual network control apparatus 100 in an embodiment of the present invention. The virtual network control apparatus 100 in FIG. 4 includes a drive device 150, an auxiliary storage device 152, a memory device 153, a CPU 154, an interface device 155, a display device 156 and an input device 157 and the like, which are mutually connected by a bus B.

A program that implements processing on the virtual network control apparatus 100 is provided by a recording medium 151 such as a CD-ROM or a memory card or the like. When the recording medium 151 storing the program is set in the drive device 150, the program is installed into the auxiliary storage device 152 from the recording medium 151 via the drive device 150. However, installation of the program is not necessarily executed from the recording medium 151, and may also be downloaded from another computer via the network. The auxiliary storage device 152 stores the installed program, and stores required files, data, and the like as well.

Upon receiving a command to activate the program, the memory device 153 reads the program from the auxiliary storage device 152, to load the program. The CPU 154 realizes a function which relates to the virtual network control apparatus 100 according to the program stored in the memory device 153. The interface device 155 is used as an interface for connecting with the network. The display device 156 displays a GUI (Graphical User Interface) and the like by the program. The input device 157 is formed by a keyboard and a mouse, a button or a touch panel and the like, and is used by inputting various operation instructions.

(Detailed Example of Processing in the Virtual Network Control Agent 110)

In the following, an example of an optimization problem used when calculating the use plan of the resources over the future in the virtual network control agent 110 is described. The virtual network control agent 110 solves the optimization problem to determine accommodation portions (accommodation portions in physical resources) of virtual nodes and links (virtual kinks) between virtual nodes in each time (1, 2, . . . , H) from time 1 to time H in a case where the current time for performing control is 0. Note that the virtual network control agent 110 is described here, but, other virtual network agents are performing similar processing.

In this optimization problem, as inputs, a set $N^p$ of nodes in the network, a set $L^p$ of links, and a set $P^p$ of paths on the physical network are given. These pieces of information can be obtained from the network database 80.

Each element p of the set $P^p$ of paths is represented as a set of links through which the path passes, the start point node is represented as $n_p^{start}$ and the end point node is represented as $n_p^{end}$, and also, $G_{p,l}$ is defined such that it becomes 1 when the path p passes through the link l, and it becomes 0 in other cases.

Also, for each node $n \in N^p$, a total amount $U_n(t)$ of computation resources that can be provided at each time t is given for the virtual network in which a resource amount reserved from other virtual networks are excluded. This can be obtained, for example, by inputting the resource amount reserved from other virtual networks at each time t from the physical network resource management agent 130, and subtracting the resource amount reserved from the other virtual networks from the whole resource amount of nodes obtained from the network database 80. Also, for each link $l \in L^p$, a total amount $B_l(t)$ of bands that can be provided at each time t is given for the virtual network in which a resource amount reserved from other virtual networks are excluded. This can be also obtained by inputting the resource amount reserved from other virtual networks at each time t from the physical network resource management agent 130, and subtracting the resource amount reserved from the other virtual networks from the whole resource amount of links obtained from the network database 80.

Also, as a virtual network embedding request corresponding to the virtual network control agent 110, a set $N^v$ of virtual nodes and a set $L^v$ of virtual links for which embedding is necessary are given. For each virtual link $l \in L^v$, a virtual node $v_l^{start}$ that is a startpoint, a virtual node $v_l^{end}$ that is an end point, and a prediction value $\hat{b}_l(t)$ of a traffic amount that flows in the virtual link at time t are given. Note that, in the text of the specification, for the sake of convenience of representation, ^ (hat) indicating a prediction value is described in the right side of a character instead of the top of the character.

As to each virtual node $v \in N^v$, a prediction value $\hat{u}_v(t)$ of computational resources required by the virtual node at time t is given. Note that, the prediction value $\hat{b}_l(t)$ of the traffic amount that flows in the virtual link, and the prediction value $\hat{u}_v(t)$ of the computational resources required by the virtual node at time t are results of demand prediction obtained in step S102 in FIG. 3.

In this optimization problem, using the above-mentioned inputs, a physical node for accommodating a virtual node and a path (a transmission route including one or a plurality of physical links) for accommodating a virtual link at time t are determined.

Here, $M_{v,n}^{Node}(t)$ is a variable that becomes 1 when a virtual node v is accommodated in a physical node n at time t and becomes 0 in other cases, and is defined such that the variable is a variable representing a physical node of an accommodation destination of the virtual node. In the same way, $M_{l,p}^{Link}(t)$ is a variable that becomes 1 when a virtual link l is accommodated in a path p at time t and becomes 0 in other cases, and is defined such that the variable is a variable representing a path of an accommodation destination of the virtual link. Also, it is assumed that $M_{v,n}^{Node}(0)$ and $M_{l,p}^{Link}(0)$ are given corresponding to portions where a virtual node and a virtual link are accommodated when control is performed.

Also, a cost for accommodating a virtual node v in a physical node n at time t is defined as $C_{n,v}(t)$. In this optimization problem, the following function is given as an objective function.

$$\text{minimize} (1-w) \sum_{0 < t \leq H, n \in N^p, v \in N^v} M_{v,n}^{Node}(t) C_{n,v}(t) + \qquad \text{[Equation 1]}$$

$$w \sum_{0<t\leq H, n\in N^P, v\in N^v} |M_{v,n}^{Node}(t) - M_{v,n}^{Node}(t-1)|$$

In this objective function, the first term is the total sum of cost in all times, the second term is cost for movement of virtual nodes, and w is a weighting parameter. This objective function is an objective function to minimize a sum of a value obtained by multiplying the first term by (1−w) and a value obtained by multiplying the second term by w. The first term is an example of an indicator on use state of physical resources, and the second term is an example of an indicator on load for assignment change of resources at each time. Also, w is a real number that is equal to or greater than 0 and that is equal to or less than 1.

The virtual network control agent 110 can avoid necessity of movement of many virtual nodes while reducing the cost for embedding virtual nodes at each time by performing control in accordance with the objective function. This cost ($C_{n,v}(t)$) is defined as a function that monotonically increases as resources that the physical node can provide increase, so that it becomes possible to avoid using a physical node having large available resources, to urge selection of a node having available resources as small as possible among physical nodes that can provide required computational resources, and to reduce the number of physical nodes used for accommodation of virtual networks.

The virtual network control agent 110 searches a solution within a range that satisfies the following constraints as to this optimization problem.

Constraint 1: every virtual node is accommodated in a physical node.

$$0 < t \leq H, \forall v \in N^v: \sum_{n \in N^P} M_{v,n}^{NODE}(t) = 1 \quad \text{[Equation 2]}$$

Constraint 2: every virtual link is accommodated in a path.

$$0 < t \leq H, \forall l \in L^v: \sum_{p \in P^P} M_{l,p}^{LINK}(t) = 1 \quad \text{[Equation 3]}$$

Constraint 3: A virtual link is accommodated only in a path whose start point is a physical node that accommodates a virtual node that is a start point of the virtual link.

$$0 < t \leq H, \forall l \in L^v, \forall p \in P^P: M_{l,p}^{LINK}(t) \leq M_{v_l^{start}, n_p^{start}}^{Node}(t) \quad \text{[Equation 4]}$$

Constraint 4: A virtual link is accommodated only in a path whose end point is a physical node that accommodates a virtual node that is an end point of the virtual link.

$$0 < t \leq H, \forall l \in L^v, \forall p \in P^P: M_{l,p}^{LINK}(t) \leq M_{v_l^{end}, n_p^{end}}^{Node}(t) \quad \text{[Equation 5]}$$

Constraint 5: Computational resources required by virtual nodes accommodated in each physical node are less than computational resources that can be provided by physical nodes.

$$0 < t \leq H, \forall n \in N^P: \sum_{v \in N^v} M_{v,n}^{NODE}(t)\hat{u}_v(t) \leq U_n(t) \quad \text{[Equation 6]}$$

Constraint 6: A total amount of bands required by virtual links accommodated in each physical link are less than bands that can be provided by the physical links.

$$0 < t \leq H, \forall l^p \in L^p: \sum_{l^v \in L^v, p \in P^P} G_{p,l^p} M_{l^v,p}^{LINK}(t) \leq B_{l^p}(t) \quad \text{[Equation 7]}$$

The virtual network control agent 110 solves the above optimization problem to be able to calculate places (physical nodes, paths) for accommodating each virtual node and virtual link at each time from time 1 to time H. Then, by notifying the physical network resource management agent 130 of the calculated result and the prediction values of required computational resources and bands, so that the physical network resource management agent 130 can ascertain resources to be used by the virtual network at each time up to the future time H, and other virtual network control agent can determine resources to be used by a virtual network corresponding to the other virtual network control agent in consideration of resources used by the virtual network over the future.

The virtual network control agent 110 transmits, to the setting apparatus 90, setting information for accommodating a virtual node in a physical node determined at time 1 and accommodating a virtual link in a determined path at time 1 among places for accommodating virtual nodes and virtual links obtained as a result of the above optimization problem, and the setting apparatus 90 inputs the settings in corresponding apparatuses in the physical network. As to accommodation places of virtual nodes and virtual links at or after time 2, the virtual network control agent 110 performs prediction of demand again after obtaining an observation result of new demand of the virtual network, and, the virtual network control agent 110 performs calculation again after obtaining new use available resource information by waiting until other virtual network control agents calculate use resources and notifies the physical network resource management agent 130 of information of future use resources.

According to the control of the present embodiment, since each virtual network control agent calculates only accommodation portions of virtual nodes and virtual links of the corresponding virtual network, it is possible to restrict computation time to be short, so that calculation of accommodation portions of virtual nodes and virtual links can be repeated at a short time period. Also, by repeating this control at a short period, it becomes possible to cope with a case where a new virtual network embedding request occurs or unpredictable demand change occurs while reducing load for virtual node movement by considering future demand change.

The present invention is not limited to the above-mentioned embodiment, and can be variously changed and applied within the claims.

The present patent application claims priority based on Japanese patent application No. 2015-095193, filed in the JPO on May 7, 2015, and the entire contents of the Japanese patent application No. 2015-095193 are incorporated herein by reference.

DESCRIPTION OF REFERENCE SIGNS

10, 20 node
11, 21, 22 virtual machine 30-50 transfer apparatus
60, 70 service control apparatus
80 network database
90 setting apparatus
100 virtual network control apparatus
110, 120 virtual network control agent
111 demand prediction unit
112 use resource determination unit
130 physical network resource management agent
131 resource state management unit

The invention claimed is:

1. A virtual network control apparatus configured to perform assignment of physical resources under management for a virtual network embedding request, comprising:
processing circuitry configured to implement:
a physical network resource management agent configured to manage use state of resources on a physical network at each future time; and
a virtual network control agent that is provided for each of a plurality of virtual networks, the virtual network control agent being generated after an embedding request is received for the respective corresponding virtual network,
the virtual network control agent comprising:
a demand prediction unit configured to perform prediction of future demand for the corresponding virtual network; and
a use resource determination unit configured to calculate physical resources to be used at each future time by the virtual network based on a prediction result of the demand obtained by the demand prediction unit and information of future use state of resources on the physical network obtained from the physical network resource management agent, and to notify the physical network resource management agent of information of physical resources of the calculation result.

2. The virtual network control apparatus as claimed in claim 1, wherein each virtual network control agent calculates physical resources for use at each future time in the corresponding virtual network, notifies the physical network resource management agent of a calculation result, and determines resources that each virtual network uses while exchanging, via the physical network resource management agent, information on resources that are predicted to be used by other virtual networks at each future time.

3. The virtual network control apparatus as claimed in claim 1, wherein the use resource determination unit is configured to input the prediction result of demand of the virtual network and use state of resources of the physical network by other virtual networks at each future time, and to determine resources to be used by the virtual network at each future time by solving an optimization problem for minimizing a weighted sum of an indicator on use state of physical resources and an indicator on load for change of assignment of resources at each time.

4. The virtual network control apparatus as claimed in claim 1, wherein, the virtual network control agent performs resource assignment to the virtual network by repeatedly executing processing in which:
the use resource determination unit performs resource assignment of a next time for the virtual network based on the calculation result, and after that, obtains use state of physical resources at future time via the physical network resource management agent again,
the demand prediction unit corrects the prediction result of demand based on new observation data, and
the use resource determination unit calculates physical resources to be used by the virtual network at each future time based on the use state of physical resources obtained again and the corrected prediction result of demand.

5. A virtual network control method executed by a virtual network control apparatus configured to perform assignment of physical resources under management for a virtual network embedding request,
the virtual network control apparatus comprising:
processing circuitry configured to implement:
a physical network resource management agent configured to manage use state of resources on a physical network at each future time; and
a virtual network control agent that is provided for each of a plurality of virtual networks, the virtual network control agent being generated after an embedding request is received for the respective corresponding virtual network,
the virtual network control method comprising:
a demand prediction step of performing, by the virtual network control agent, prediction of future demand for the corresponding virtual network; and
a use resource determination step of calculating physical resources to be used at each future time by the virtual network based on a prediction result of the demand obtained by the demand prediction step and information of future use state of resources on the physical network obtained from the physical network resource management agent, and notifying the physical network resource management agent of information of physical resources of the calculation result.

6. The virtual network control method as claimed in claim 5, wherein each virtual network control agent calculates physical resources for use at each future time in the corresponding virtual network, notifies the physical network resource management agent of a calculation result, and determines resources that each virtual network uses while exchanging, via the physical network resource management agent, information on resources that are predicted to be used by other virtual networks at each future time.

7. The virtual network control method as claimed in claim 5, wherein, in the use resource determination step, the virtual network control agent inputs the prediction result of demand of the virtual network and use state of resources of the physical network by other virtual networks at each future time, and determines resources to be used by the virtual network at each future time by solving an optimization problem for minimizing a weighted sum of an indicator on use state of physical resources and an indicator on load for change of assignment of resources at each time.

8. A non-transitory computer readable recording medium storing a program for causing a computer to function as each unit of the virtual network control apparatus as claimed in claim 1.

* * * * *